US011637611B2

United States Patent
Xia et al.

(10) Patent No.: US 11,637,611 B2
(45) Date of Patent: Apr. 25, 2023

(54) METHODS AND APPARATUS FOR BEAM MANAGEMENT FOR DEVICE COMMUNICATIONS

(71) Applicant: Huawei Technologies Co., Ltd., Shenzhen (CN)

(72) Inventors: Pengfei Xia, San Diego, CA (US); Bin Liu, San Diego, CA (US); Young Hoon Kwon, Laguna Niguel, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/425,500

(22) PCT Filed: Nov. 7, 2019

(86) PCT No.: PCT/US2019/060221
§ 371 (c)(1),
(2) Date: Jul. 23, 2021

(87) PCT Pub. No.: WO2020/159597
PCT Pub. Date: Aug. 6, 2020

(65) Prior Publication Data
US 2022/0060240 A1 Feb. 24, 2022

Related U.S. Application Data

(60) Provisional application No. 62/798,254, filed on Jan. 29, 2019.

(51) Int. Cl.
*H04B 7/06* (2006.01)
*H04W 16/28* (2009.01)

(52) U.S. Cl.
CPC .......... *H04B 7/0695* (2013.01); *H04W 16/28* (2013.01)

(58) Field of Classification Search
CPC ...... H04B 7/0695; H04B 7/088; H04W 16/28
See application file for complete search history.

(56) References Cited

U.S. PATENT DOCUMENTS

| 2015/0236772 | A1* | 8/2015 | Hammarwall | ........ H04W 24/10 370/329 |
| 2016/0119910 | A1* | 4/2016 | Krzymien | ............ H04B 7/0639 370/329 |

(Continued)

FOREIGN PATENT DOCUMENTS

| CN | 106559121 A | 4/2017 |
| CN | 106921423 A | 7/2017 |

(Continued)

OTHER PUBLICATIONS

Sony, "RRM Measurements open issues," 3GPP TSG RAN WG2 Meeting #98,R2-1704832, Agenda Item 10.4.1.3, Hangzhou, China, May 15-19, 2017, 8 pages.

*Primary Examiner* — Kenneth T Lam
(74) *Attorney, Agent, or Firm* — Slater Matsil, LLP

(57) ABSTRACT

A method includes receiving, from a second device, a signal using each beam of a first subset of beams of a beam set arranged in a layout, measuring a beam quality of the signal received using each beam of the first subset of beams, estimating a beam quality of the signal for each beam of a second subset of beams of the beam set, the first subset of beams and the second subset of beams comprising different beams, and the estimating being in accordance with the measured signal quality of the first subset of beams, selecting a beam from the beam set, selecting the beam being in accordance with the measured beam quality and the estimated beam quality, and communicating, with the second device, using the beam.

21 Claims, 8 Drawing Sheets

(56) References Cited

U.S. PATENT DOCUMENTS

2017/0303265 A1* 10/2017 Islam .................. H04B 7/0695
2018/0212651 A1*  7/2018 Li ........................ H04B 7/0686
2018/0287686 A1* 10/2018 John Wilson ........ H04B 7/0632

FOREIGN PATENT DOCUMENTS

| EP | 3404845 A1 | 11/2018 |
|----|------------|---------|
| WO | 2016051792 A1 | 4/2016 |
| WO | 2018013596 A1 | 1/2018 |

* cited by examiner

METHODS AND APPARATUS FOR BEAM MANAGEMENT FOR DEVICE COMMUNICATIONS

PRIORITY CLAIM

This application is a national phase filing under section 371 of PCT/US2019/060221, filed Nov. 7, 2019 and entitled "Methods and Apparatus for Beam Management for Device Communications," which claims the benefit of U.S. Provisional Application No. 62/798,254, filed on Jan. 29, 2019, entitled "System and Method for Beam Management for Device Communications," each of which is incorporated herein by reference in its entirety.

TECHNICAL FIELD

The present disclosure relates generally to methods and apparatus for digital communications, and, in particular embodiments, to methods and apparatus for beam management for device communications.

BACKGROUND

Fifth generation (5G) New Radio (NR) communication systems use millimeter wave frequency (e.g., 28 GHz) and beyond to exploit greater bandwidth to improve throughput, reduce latency, increase spatial reuse, etc. Beamforming, where energy associated with a transmission is concentrated in a particular spatial direction instead of being spread in an omnidirectional manner, is used at the higher operating frequencies to compensate for greater pathloss at the high frequencies.

The directional nature of the communication beams requires that a communicating beam pair (a transmit beam at a transmitting device and a receive beam at a receiving device) be oriented towards or substantially towards each other in order to ensure that communications occurring over the communicating beam pair succeed. If the beams of the communicating beam pair are not oriented towards each other, a significant amount of the energy associated with the signal transmission will not be oriented toward the receiving device, and the receive gain at the receiving device will be insufficient to successfully receive the signal transmission. In other words, the communicating devices should be located within (or close to being located within) beam coverage patterns of the communicating beam pair in order to ensure successful communications.

The process of selecting the communicating beams of a communicating beam pair is referred to as beam management. The overhead associated with beam management may be high, especially when the number of beams used to provide coverage for an area of interest is increased to improve coverage. Therefore, there is a need for methods and apparatus for beam management for device communications.

SUMMARY

According to a first aspect, a method implemented by a first device is provided. The method comprising receiving, by the first device, from a second device, a signal using each beam of a first subset of beams of a beam set arranged in a layout; measuring, by the first device, a beam quality of the signal received using each beam of the first subset of beams; estimating, by the first device, a beam quality of the signal for each beam of a second subset of beams of the beam set, the first subset of beams and the second subset of beams comprising different beams, and the estimating being in accordance with the measured signal quality of the first subset of beams; selecting, by the first device, a beam from the beam set, selecting the beam being in accordance with the measured beam quality and the estimated beam quality; and communicating, by the first device, with the second device, using the beam.

In a first implementation form of the method according to the first aspect as such, the first subset of beams and the second subset of beams being disjoint.

In a second implementation form of the method according to the first aspect as such or any preceding implementation form of the first aspect, a coverage area of each beam of the second subset of beams partially overlapping a coverage area of at least two beams of the first subset of beams.

In a third implementation form of the method according to the first aspect as such or any preceding implementation form of the first aspect, estimating the beam quality comprising, for each beam of the second subset of beams, determining the estimated beam quality of the beam of the second subset of beams as a combination of the measured beam quality of the at least two beams of the first subset of beams having a coverage area that partially overlaps a coverage area of the beam of the second subset of beams.

In a fourth implementation form of the method according to the first aspect as such or any preceding implementation form of the first aspect, wherein the combination includes one of a sum, a weighted sum, a product, a weighted product, a linear combination, or a non-linear combination, of the measure beam quality of the at least two beams.

In a fifth implementation form of the method according to the first aspect as such or any preceding implementation form of the first aspect, the estimated beam quality being a weighted sum of the measured beam quality of the at least two beams, and the method further comprising determining, by the first device, a weighting factor for each beam of the first subset of beams.

In a sixth implementation form of the method according to the first aspect as such or any preceding implementation form of the first aspect, wherein the beam quality comprises at least one of a signal plus interference to noise ratio (SINR) of the signal, a signal to noise ratio (SNR) of the signal, a reference signal received power (RSRP) of the signal, a reference signal received quality (RSRQ) of the signal, or a received signal power of the signal.

In a seventh implementation form of the method according to the first aspect as such or any preceding implementation form of the first aspect, the first device being a user equipment (UE), and the second device being an access node.

In an eighth implementation form of the method according to the first aspect as such or any preceding implementation form of the first aspect, the beam set comprising 9 beams arranged in a 3×3 grid layout, and the first subset of beams comprising 4 beams arranged in a diamond layout.

In a ninth implementation form of the method according to the first aspect as such or any preceding implementation form of the first aspect, the beam set comprising 9 beams arranged in a 3×3 grid layout, and the first subset of beams comprising 5 beams arranged in a diagonal layout.

According to a second aspect, a method implemented by a first device is provided. The method comprising receiving, by the first device, from a second device, a signal using each beam of a first subset of a set of 7 beams arranged in a hexagonal layout; determining, by the first device, a beam quality of the signal received using the first subset of the set of 7 beams; selecting, by the first device, a beam from the set of 7 beams, selecting the beam being in accordance with the beam qualities; and communicating, by the first device, with the second device, using the one beam.

In a first implementation form of the method according to the second aspect as such, the first subset of the set of 7 beams comprising all 7 beams of the set of 7 beams, and determining the beam quality comprising measuring the beam quality of the signal received using each beam of the set of 7 beams.

In a second implementation form of the method according to the second aspect as such or any preceding implementation form of the second aspect, determining the beam quality comprising measuring, by the first device, the beam quality of the signal received using each beam of the first subset of beams; and estimating, by the first device, the beam quality of the signal for each beam of a second subset of the set of 7 beams, the first subset of beams and the second subset of beams comprising different beams of the set of 7 beams.

According to a third aspect, a first device is provided. The first device includes a non-transitory memory storage comprising instructions, and one or more processors in communication with the memory storage, wherein the one or more processors execute the instructions to receive, from a second device, a signal using each beam of a first subset of beams of a beam set arranged in a layout; measure a beam quality of the signal received using each beam of the first subset of beams; estimate a beam quality of the signal for each beam of a second subset of beams of the beam set, the first subset of beams and the second subset of beams comprising different beams, and the estimating of the beam quality of the signal being in accordance with the measured signal quality of the first subset of beams; select a beam from the beam set, selecting the beam being in accordance with the measured beam quality and the estimated beam quality; and communicate, with the second device, using the beam.

In a first implementation form of the first device according to the third aspect as such, the first subset of beams and the second subset of beams being disjoint.

In a second implementation form of the first device according to the third aspect as such or any preceding implementation form of the third aspect, a coverage area of each beam of the second subset of beams partially overlapping a coverage area of at least two beams of the first subset of beams.

In a third implementation form of the first device according to the third aspect as such or any preceding implementation form of the third aspect, the one or more processors further executing the instructions to, for each beam of the second subset of beams, determine the estimated beam quality of the beam of the second subset of beams as a combination of the measured beam quality of the at least two beams of the first subset of beams having a coverage area that partially overlaps a coverage area of the beam of the second subset of beams.

In a fourth implementation form of the first device according to the third aspect as such or any preceding implementation form of the third aspect, wherein the combination includes one of a sum, a weighted sum, a product, a weighted product, a linear combination, or a non-linear combination, of the measure beam quality of the at least two beams.

In a fifth implementation form of the first device according to the third aspect as such or any preceding implementation form of the third aspect, the estimated beam quality being a weighted sum of the measured beam quality of the at least two beams, and the one or more processors further executing the instructions to determine a weighting factor for each beam of the first subset of beams.

In a sixth implementation form of the first device according to the third aspect as such or any preceding implementation form of the third aspect, wherein the beam quality comprises at least one of a SINR of the signal, a SNR of the signal, a RSRP of the signal, a RSRQ of the signal, or a received signal power of the signal.

In a seventh implementation form of the first device according to the third aspect as such or any preceding implementation form of the third aspect, the beam set comprising 9 beams arranged in a 3×3 grid layout, and the first subset of beams comprising 4 beams arranged in a diamond layout.

In an eighth implementation form of the first device according to the third aspect as such or any preceding implementation form of the third aspect, the beam set comprising 9 beams arranged in a 3×3 grid layout, and the first subset of beams comprising 5 beams arranged in a diagonal layout.

An advantage of a preferred embodiment is that the beam management overhead is reduced. Therefore, the overall communications overhead is reduced for beamformed communications or overall communications overhead is maintained while increasing the number of communication beams, which improves communication performance.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The structure and use of disclosed embodiments are discussed in detail below. It should be appreciated, however, that the present disclosure provides many applicable concepts that can be embodied in a wide variety of specific contexts. The specific embodiments discussed are merely illustrative of specific structure and use of embodiments, and do not limit the scope of the disclosure.

Figure 1:
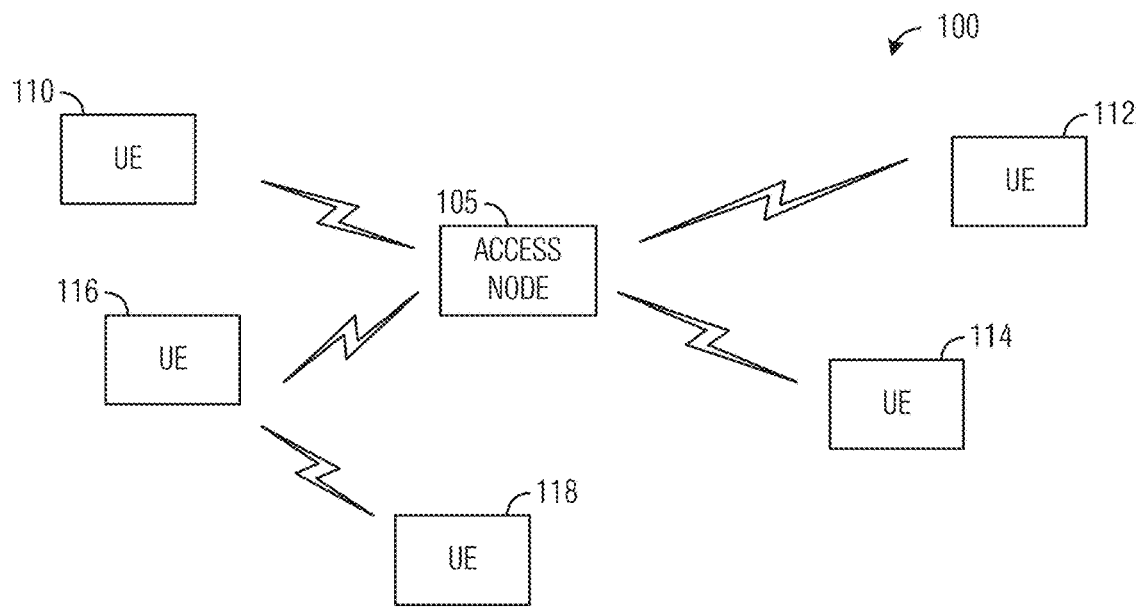
FIG. 1 illustrates an example communications system.

FIG. 1 illustrates an example communications system 100. Communications system 100 includes an access node 105 serving user equipments (UEs), such as UEs 110, 112, 114, 116, and 118. In a first operating mode, communications to and from a UE passes through access node 105. In a second operating mode, communications to and from a UE do not pass through access node 105, however, access node 105 typically maintains control of resources used by the UE to communicate when specific conditions are met. Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, and so on, while UEs may also be commonly referred to as mobile stations, mobiles, terminals, users, subscribers, stations, and the like. Access nodes may provide wireless access in accordance with one or more wireless communication protocols, e.g., the Third Generation Partnership Project (3GPP) long term evolution (LTE), LTE advanced (LTE-A), 5G, 5G LTE, 5G NR, High Speed Packet Access (HSPA), the IEEE 802.11 family of standards, such as 802.11a/b/g/n/ac/ad/ax/ay/be, etc. While it is understood that communications systems may employ multiple access nodes capable of communicating with a number of UEs, only one access node and five UEs are illustrated for simplicity.

As discussed previously, pathloss in communications systems operating at high frequency (HF) (6 gigahertz (GHz) and above, such as millimeter wavelength (mm-Wave)) operating frequencies, is high, and beamforming may be used to overcome the high pathloss. As shown in FIG. 1, both access node 105 and UE 112 may communicate using beamformed transmissions and receptions. As an example, access node 105 communicates using a plurality of communications beams, while UE 115 communicates using a plurality of communications beams.

A beam may be a pre-defined set of beamforming weights in the context of codebook-based precoding or a dynamically defined set of beamforming weights in the context of non-codebook based precoding (e.g., Eigen-based beamforming (EBB)). A beam may also be a pre-defined set of phase shift preprocessors combining signals from the antenna array in the radio frequency (RF) domain. It should be appreciated that a UE may rely on codebook-based precoding to transmit uplink signals and receive downlink signals, while an access node may rely on non-codebook based precoding to form certain radiation patterns to transmit downlink signals or receive uplink signals.

A single communications beam may refer to a pair of beams, a receive beam and a transmit beam. These beams possess similar spatial domain characteristics, such as beam direction, and are said to be spatially quasi collocated (QCL). As an example, a majority of the transmit energy of the transmit beam and a majority of the receive energy of the receive beam may be oriented in similar but opposing directions, e.g., in a 2-dimensional plane, the transmit and receive energies of the transmit and receive beams associated with the single communications beam may be oriented 180 degrees opposed to each other. Hence, the reference to a communications beam may actually refer to a receive and transmit beam pair.

Figure 2:
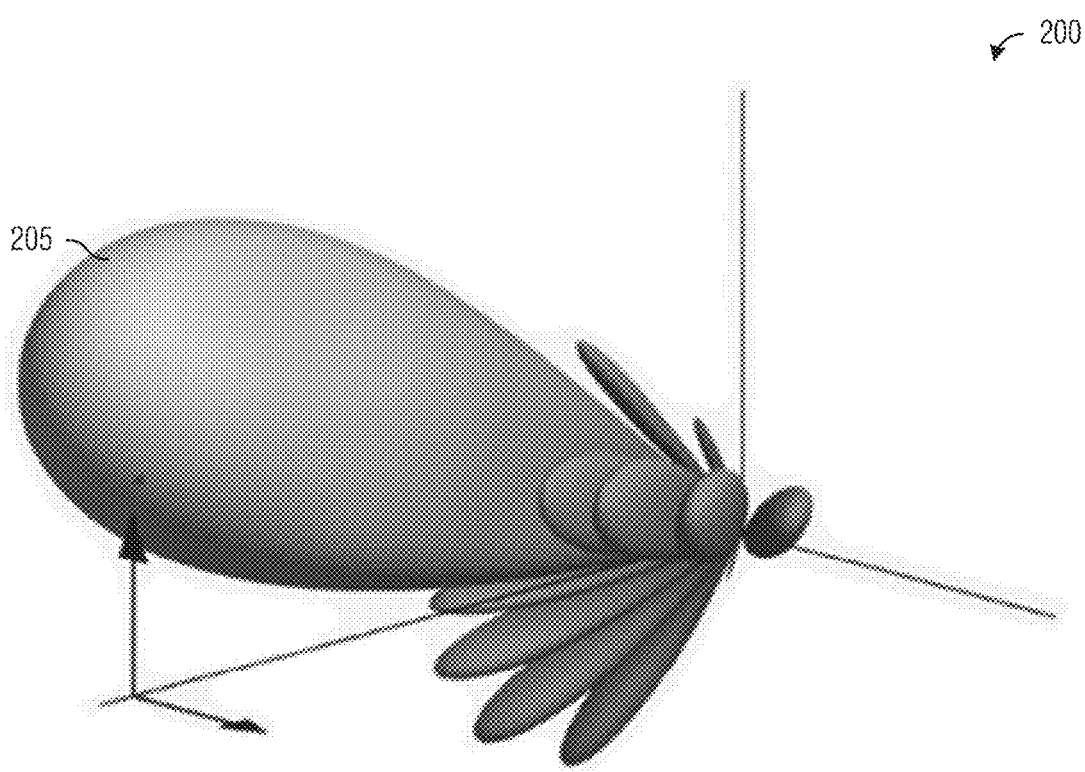
FIG. 2 illustrates a diagram of an example beam in 3-dimensional space.

A communicating device (e.g., a UE, an access node, etc.) may support multiple (e.g., N (an integer value)) communication beams, where the communicating device determines one of the N beams to use for signal reception, for example. FIG. 2 illustrates a diagram of an example beam 200 in 3-dimensional space. Beam 200 includes a main lobe 205 and a plurality of side lobes.

Figure 3:
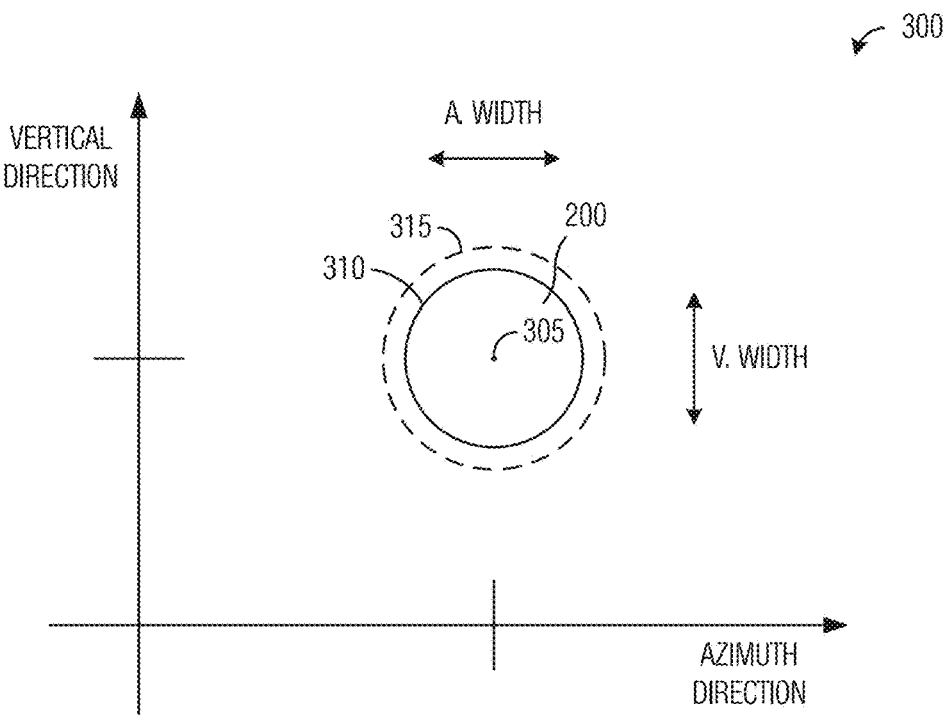
FIG. 3 illustrates a diagram of a cross-sectional elevation view of beam shown in FIG. 2.

FIG. 3 illustrates a diagram 300 of a cross-sectional elevation view of beam 200 shown in FIG. 2. Beam 200 may be described by one or more beam parameters in each of the azimuth (horizontal direction) domain and the elevation (vertical direction) domain include beam direction, beam width, and beam gain. The beam coverage pattern of a beam is related to the beam width of the beam and increases in size as the distance from the source of the beam increases.

Although beam 200 is shown as having a sharply defined circle, the signal quality of a beam typically varies throughout the coverage of the beam. Hence, the beam coverage pattern of a beam may be more accurately rendered as a variably shaded oval or round shape with fuzzy or indistinct borders, where an intensity of the shading is indicative of the signal quality of the beam and the border representing a particular signal quality value. One commonly used way to simplify the graphical representation of a communications beam and the beam coverage pattern of the communications beam is to locate a peak beam gain of the communications beam (typically shown as a point) and then draw a border encompassing the peak beam gain that represents a certain amount of gain (e.g., −3 dB) below the peak beam gain. As shown in FIG. 3, beam 200 has a peak beam gain at point 305 while circle 310 represents a −3 dB boundary, where points interior to circle 310 have beam gain more than −3 dB below the peak beam gain and points exterior to circle 310 have beam gain less than −3 dB below the peak beam gain. Furthermore, dashed circle 315 represents a −6 dB boundary. Typically, if circle 310 represents of a lower gain boundary (e.g., −6 dB, −9 dB, etc.), the border would be further away from the peak beam gain.

Figure 4:
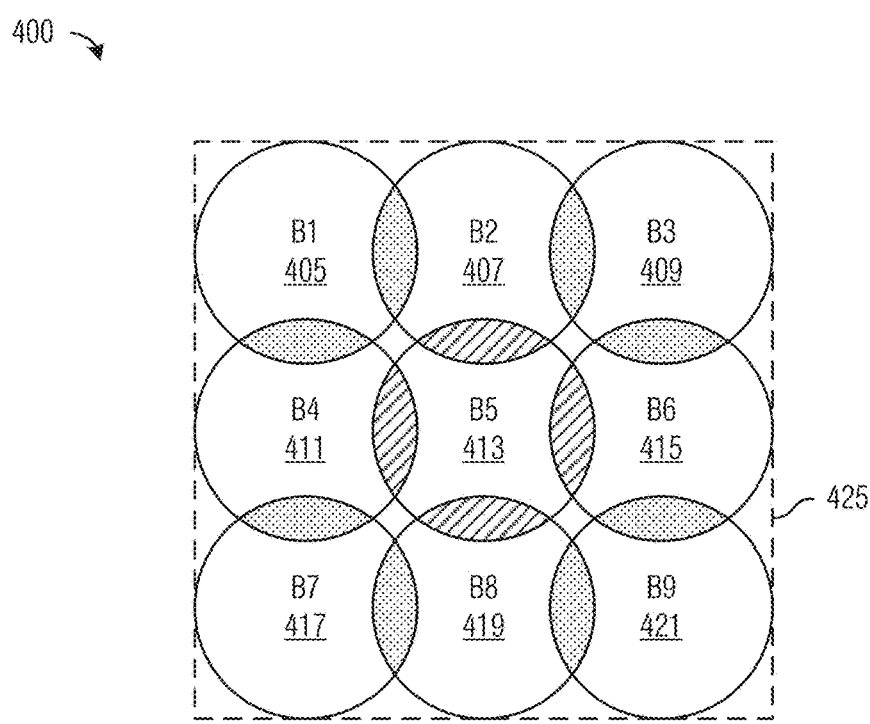
FIG. 4 illustrates a diagram highlighting a rectangular grid arrangement of communications beams.

In practice, multiple beams are formed to cover a desired area, which also may be referred to as a range or region. FIG. 4 illustrates a diagram 400 highlighting a rectangular grid arrangement of communications beams. As shown in FIG. 4, nine communications beams, beams 405-421, cover an area 425 of interest in the azimuth and vertical directions. The nine communications beams overlap in the vertical and azimuth domains, to provide for coverage with small gaps when the boundaries of the communications beams are drawn at −3 dB.

In general, there is overlap between two or more communications beams when the beam patterns of the two or more communications beams share common space. The overlaps between beam pairs are shown as hashed regions.

The overlap between communications beams shown in FIG. 4 is for a specific beam gain and beam width. If the boundaries are drawn at lower beam gains, the gaps may not be present. For example, if the boundaries are drawn at −6 dB, the circles representing the coverage patterns of the communications beams would be larger and some of the gaps that are shown in FIG. 4 may disappear, while others may become smaller. Furthermore, if the beam widths change, then the overlap will also change. The beam width of a communications beam is a function of the beamforming gain of the communications beam. As an example, if the beam widths are reduced, then the overlap will also decrease, potentially to the point where some overlap would disappear. Similarly, if the beam widths are increased, then the overlap will also increase, potentially to the point where some new overlaps are formed between beam pairs where there was previously no overlap.

As an illustrative example, if the beam widths of the communications beams shown in FIG. 4 are increased, then, at some point, an overlap may form between communications beams arranged in a diagonal fashion. For example, an overlap may form between communications beams B1 405 and B5 413.

A beam management procedure is performed by the communicating device to select which one of the communications beams to use to communicate. As an example, a P3 beam management procedure is defined in the 3GPP technical standards to enable a communicating device to select a communications beam. According to the P3 beam management procedure, an access node (or a transmitting device) transmits a signal over at least a portion of each of N consecutive time slots, where N is the number of communications beams that a UE (or a receiving device) uses to cover the area of interest. In the example shown in FIG. 4, N is equal to 9. The UE (or the receiving device) uses one of the N communications beams in a time slot to measure the signal transmitted by the access node (or the transmitting device) in the time slot. Over the N time slots, all of the N communications beams are used to measure the signal. There may be no particular order in which the UE (or the receiving device) uses the N communications beams to receive the signal. The UE (or the receiving device) determines a signal quality, e.g., a signal plus interference to noise ratio (SINR), signal to noise ratio (SNR), reference signal received power (RSRP), reference signal received quality (RSRQ), received signal power, etc., for the received signals.

The UE (or the receiving device) compares the measurement results of the N communications beams and selects a best beam to use to communicate with the access node (or the transmitting device). The selection of the best beam may be in accordance with a highest beam quality, for example. If there are multiple beams with substantially equal beam quality, the UE (or the receiving device) may randomly select the best beam, or use an additional selection criterion to select the best beam. Examples of the additional selection criterion may include usage history of the beams, performance history of the beams, available bandwidth of the beams, number of times the beams are selected as best beam, and so forth. The UE (or the receiving device) uses the best beam to communicate with the access node (or the transmitting device). Although the discussion focuses on receiving devices and transmitting devices, in general, a receiving device is also capable of transmitting, and similarly, a transmitting device is also capable of receiving. Therefore, the use of receiving device and transmitting device should not be construed as being limiting to the scope of the example embodiments.

An issue associated with the P3 beam management procedure is the relatively large overhead, especially when the number of communications beams (N) is large. Furthermore, the overhead grows linearly with increasing N.

In general, there is an area of interest to be covered by the multiple communications beams, possibly partially overlapping with each other. Although the coverage area for each beam is illustrated as a circle in FIG. 4, this may not be the case in practice, and depends on the beam width in the azimuth (horizontal) domain and elevation (vertical) domain, which may be different from each other. To reduce the total number of communications beams covering the area of interest, it is beneficial to use a circular beam pattern (i.e., roughly similar beam width in the azimuth and vertical domains). The circular shape is generally more efficient in filling the area of interest than an oblong shape. More efficiency can mean a smaller number of beams, which yields lower overhead in the P3 beam management procedure.

According to an example embodiment, a hexagonal beam layout is used instead of a rectangular grid layout, as shown in FIG. 4, to cover an area of interest. As shown in FIG. 4, communications beams B2 407 and B5 413 have the same beam direction in the azimuth domain but not in the vertical domain, while communications beams B6 415 and B5 413 have the same beam direction in the vertical domain but not in the azimuth domain. Such a horizontal-vertical layout is simple, but may lead to the unnecessary use of a greater number of communications beams to cover the area of interest than required. An embodiment hexagonal beam layout places the communications beams in a hexagonal arrangement.

Figure 5:
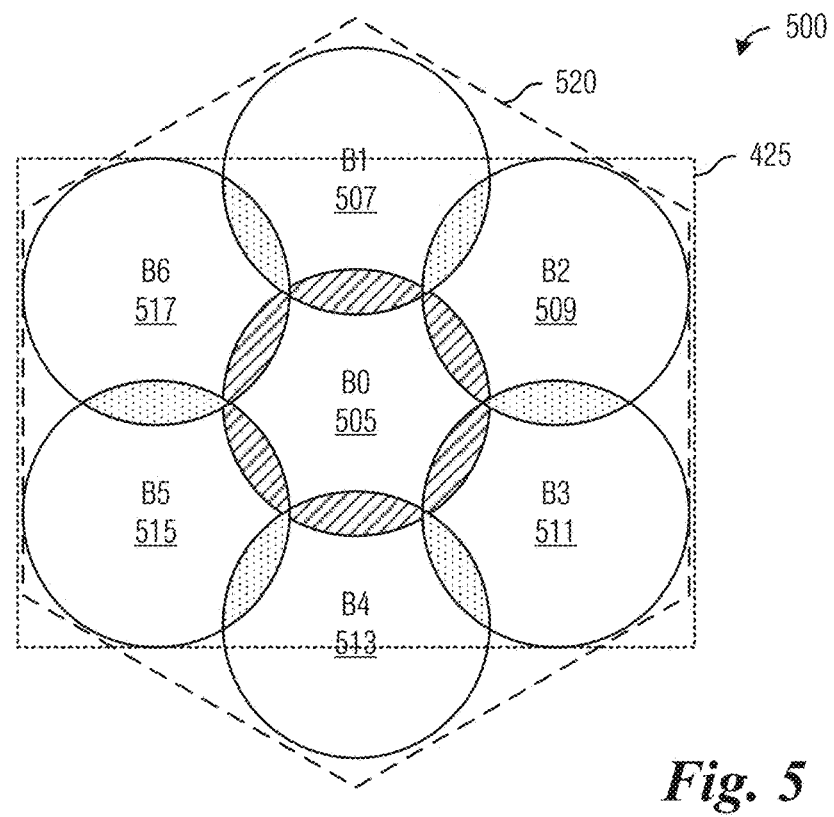
FIG. 5 illustrates a diagram highlighting a hexagonal arrangement of communications beams according to example embodiments presented herein.

FIG. 5 illustrates a diagram 500 highlighting a hexagonal arrangement of communications beams. As shown in FIG. 5, seven communications beams, beams 505-517, cover an area of interest 520 in the azimuth and vertical directions. Although seven communications beams are illustrated in FIG. 5, the number can be generalized to be fewer or more than seven communications beams. An example benefit of fewer communications beams is lower overhead in the P3 beam management procedure.

The hexagonal arrangement of the beam patterns of the communications beams provides comparably sized coverage of the same area of interest as the rectangular grid arrangement, as shown in FIG. 4 (area of interest 520 versus area of interest 425), but reduces the number of communications beams, and hence, the overhead associated with the P3 beam management procedure.

According to an example embodiment, a technique where beam quality measurements are made for a subset of communications beams and then estimates of the beam quality of the remaining communications beams is provided. In this example embodiment, beam quality measurements are not made for all of the communications beams covering the area of interest. Generally, to perform a P3 beam management procedure, beam quality measurements are made for all communications beams covering the area of interest. As an example, the signal quality of all communications beams 405-421 is measured and the best beam is subsequently selected for communication. The example embodiment may take place at any receiving device that is selecting one or more communications beams from a plurality of communications beams covering an area of interest. As an example, a UE operating as the receiving device may select one or more communications beams to receive a transmission from an access node. As another example, an access node operating as the receiving device may select one or more communications beams to receive a transmission from a UE.

Figure 6:
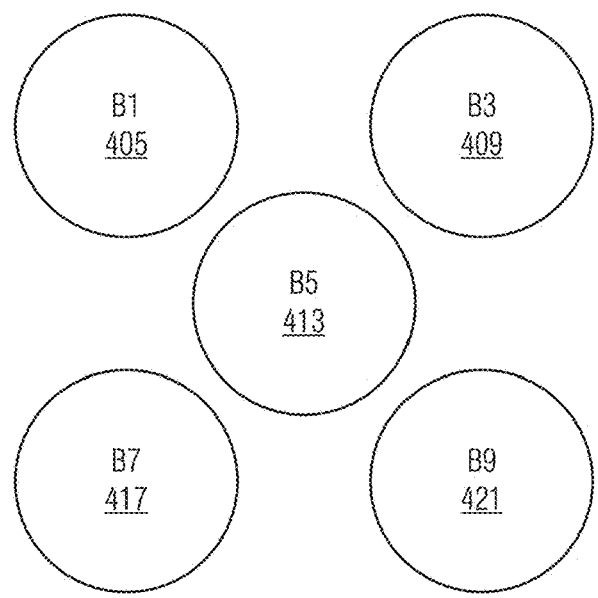
FIG. 6 illustrates a diagram of communications beams of subset A according to example embodiments presented herein.
Figure 7:
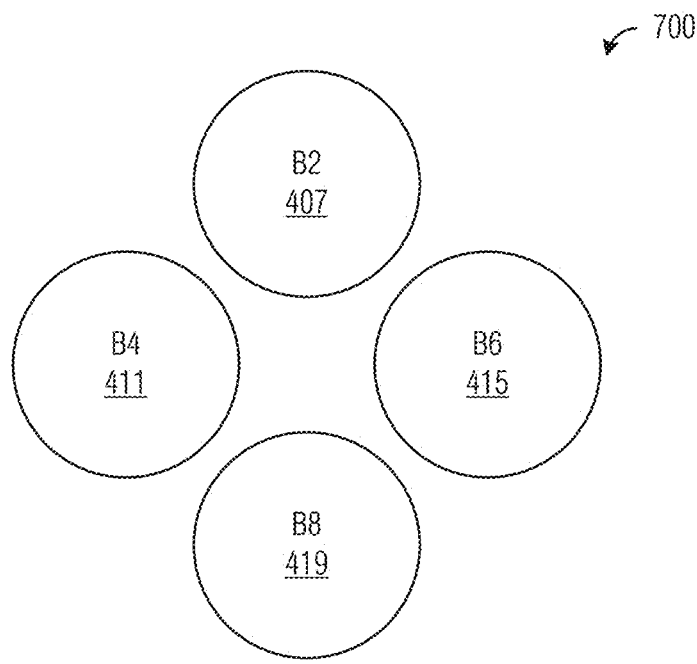
FIG. 7 illustrates a diagram of communications beams of subset B according to example embodiments presented herein.

In this example embodiment, the communications beams covering the area of interest are partitioned into two subsets, e.g., subset A and B. Measurements are made of beam quality of the communications beams of a first subset (e.g., subset A) and the beam quality measurements are used to estimate the beam quality of the communications beams of a second subset (e.g., subset B), or vice versa. Measuring the beam quality of only the communications beams of the first subset reduces the number of beam quality measurements involved in the beam management procedure. As an example, subset A comprises communications beams B1 405, B3 409, B5 413, B7 417, and B9 421. FIG. 6 illustrates a diagram 600 of communications beams of subset A. The particular arrangement of the communications beams of subset A is referred to as a diagonal layout or arrangement. As another example, subset B comprises communications beams B2 407, B4 411, B6 415, and B8 419. FIG. 7 illustrates a diagram 700 of communications beams of subset B. The particular arrangement of the communications beams of subset B is referred to as a diamond layout or arrangement.

In an embodiment, the two subsets are disjoint, meaning that each communications beam is a member of only one subset. In another embodiment, the communications beams of the two subsets are selected so that any one communications beam of subset A partially overlaps at least two communications beams of subset B, and vice versa. In yet another embodiment, the two subsets are different from one another. In yet another embodiment, the two subsets are different from one another, with one subset not being a subset of the other subset. In yet another embodiment, the two subsets share one or more communications beams.

As an illustrative example, the beam quality of the communications beams of subset A (communications beams B1 405, B3 409, B5 413, B7 417, and B9 421) are measured and the beam quality of the communications beams of subset B (communications beams B2 407, B4 411, B6 415, and B8 419) are estimated. As another illustrative example, the beam quality of the communications beams of subset B (communications beams B2 407, B4 411, B6 415, and B8 419) are measured and the beam quality of the communications beams of subset A (communications beams B1 405, B3 409, B5 413, B7 417, and B9 421) are estimated.

According to an example embodiment, the beam quality of a communications beam is estimated in accordance with the measured beam quality of communications beams that overlap with the communications beam being estimated. In an embodiment, the beam quality of a communications beam is estimated as a combination of the measured beam quality of communications beams that overlap with the communications beam being estimated. As an example, the beam quality of a communications beam is estimated using a sum of the measured beam quality of communications beams that overlap with the communications beam being estimated. As an example, the beam quality of a communications beam is estimated using a product of the measured beam quality of communications beams that overlap with the communications beam being estimated. As an example, the beam quality of a communications beam is estimated as a linear function of the measured beam quality of communications beams that overlap with the communications beam being estimated. As an example, the beam quality of a communications beam is estimated as a non-linear function of the measured beam quality of communications beams that overlap with the communications beam being estimated. In an embodiment, the measured beam quality of the communications beams are weighted by weighting factors. A detailed discussion of the weighting factors is presented below. As an example, the beam quality of a communications beam is estimated as a weighted sum of the measured beam quality of communications beams that overlap with the communications beam being estimated. As an example, the beam quality of a communications beam is estimated as a weighted product of the measured beam quality of communications beams that overlap with the communications beam being estimated.

Although the discussion presented below focuses on the estimating of the beam quality of a communications beam as a weighted sum of the measured beam quality of communications beams that overlap the communications beam, other estimation techniques (such as sum, product, weighted product, linear combination, non-linear combination, etc.) may be used. Therefore the discussion of weighted sums should not be construed as being limiting to the scope of the example embodiments.

Figure 8:
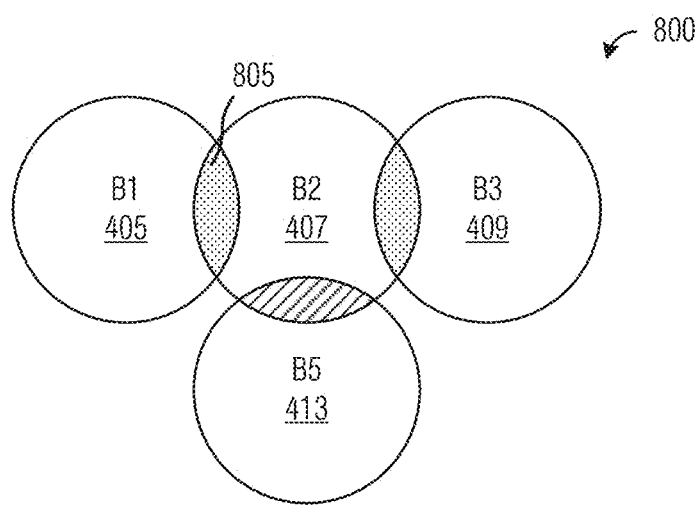
FIG. 8 illustrates a diagram of overlapping communications beams according to example embodiments presented herein.

FIG. 8 illustrates a diagram 800 of overlapping communications beams. As discussed previously, there is overlap in the beam patterns of two or more communications beams when the beam patterns of the two or more communications beams share common space. As an illustrative example, consider a first communications beam with a peak beam gain located at a first point and a first circle representing a −3 dB gain below the peak beam gain and a second communications beam with a peak beam gain located at a second point and a second circle representing a −3 dB gain below the peak beam gain, then there is an overlap between the beam patterns of the first and second communications beams if there is an intersection between the first circle and the second circle. In beam arrangements that are substantially compact, such as those discussed above in relation to FIGS. 4 and 5, beams adjacent to each other can be considered to overlap. For example, as described herein, such adjacent beams can overlap when their coverage areas are represented by a −1 dB gain circle, −3 dB gain circle, −6 dB gain circle, −9 dB gain circle, or other gains.

As shown in FIG. 8, communications beam B2 407 partially overlaps communications beams B1 405, B3 409, and B5 413. Although the complete overlap of communications beams is permissible, the complete overlap will generally reduce the efficiency of the example embodiments because the number of communications beams needed to adequately cover the area of interest is increased. The beam quality of communications beam B2 407 may be estimated utilizing the measured beam quality of communications beams B1 405, B3 409, and B5 413. As an example, a 3 dB overlap is used, which means that the overlap (region 805) of beams B1 405 and B2 407 has a beam gain of about 3 dB less than the peak beam gain of beams B1 405 and B2 407.

As an example, the beam quality of communications beam B2 407 is estimated as a weighted sum, an example of which is as follows:

$$rho2 = a1*rho1 + a3*rho3 + a5*rho5,$$

where rho2 is the estimated beam quality of communications beam B2 407; rho1, rho3 and rho5 are measured beam quality of communications beams B1 405, B3 409, and B5 413, respectively; and a1, a3 and a5 are weighting factors associated with the combination of communications beam B2 407 and communications beams B1 405, B3 409, and B5 413, respectively. Other equations using other weighting factors can also be used to estimate the beam quality of beam B2 407 using the beam quality of neighboring beams, such as by using the measured beam quality of additional nearby beams that are not directly adjacent, or using weighted product of the beam qualities, a linear relationship between the beam qualities, or a non-linear relationship between the beam qualities.

In an embodiment, the specific values of weighting factors a1, a3 and a5 depend on the specific beam patterns, degree of beam overlapping or separation, and the beam quality metric (e.g., SINR, RSRP, RSRQ, etc.), and may be determined based on the above information. The values of the weighting factors are stored in the device. The values of the weighting factors may be determined offline based on measurements. As an example, during a training stage, all communications beams covering the area of interest may be used for beam quality measurements, and then the weighting factors are calculated based on the training data (e.g., a1, a3, a5 and others). Once those weighting factors are found, the training stage is complete. In an actual data transmission or beam management stage, the trained weighting factors a1, a3 and a5 are used to predict the beam quality of communications beam B2 407 based on measurements of communications beams B1 405, B3 409, and B5 413. The training-based approach discussed below provides further details.

In the previous example, the beam quality of communications beam B2 407 is estimated using measured beam quality of communications beams B1 405, B3 409, and B5 413. The beam quality of communications beam B2 407 may alternatively be estimated using the measured beam quality of communications beams B7 417 and B9 421, as well as the measured beam quality of communications beams B1 405, B3 409, and B5 413. Similarly, the beam quality of communications beam B4 411 may be estimated using the measured beam quality of communications beams B1 405, B5 413, and B7 417. Furthermore, the beam quality of communications beam B6 415 may be estimated using the measured beam quality of communications beams B3 409, B5 413, and B9 421, while the beam quality of communications beam B8 419 may be estimated using the measured beam quality of communications beams B5 413, B7 417, and B9 421.

Figure 9:
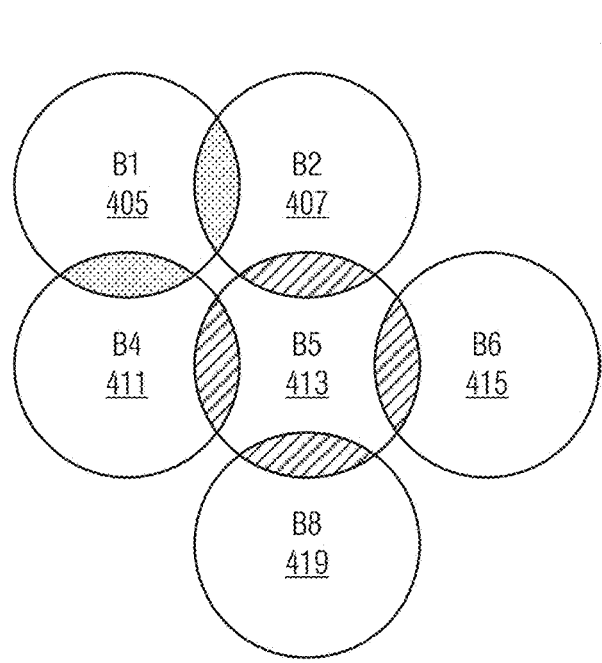
FIG. 9 illustrates a diagram of overlapping communications beams, highlighting the communications beams of subset B according to example embodiments presented herein.

FIG. 9 illustrates a diagram 900 of overlapping communications beams, highlighting the communications beams of subset B. The discussion of FIG. 8 focused on the measurement of the beam quality of the communications beams of subset A and estimating the beam quality of the communications beams of subset B using the measured beam quality of the communications beams of subset A. However, it is possible to measure the beam quality of the communications beams of subset B and estimate the beam quality of the communications beams of subset A using the measured beam quality of the communications beams of subset B.

As shown in FIG. 9, the beam quality of the communications beams of subset B (communications beams B2 407, B4 411, B6 415, and B8 419) are made in accordance with a received signal, and the measured beam quality may be used to estimate the beam quality of the communications beams of subset A (communications beams B1 405, B3 409, B5 413, B7 417, and B9 421). As an example, the beam quality of communications beam B1 405 can be estimated using the measured beam quality of communications beams B2 407 and B4 411. As another example, the beam quality of communications beam B5 413 can be estimated using the measured beam quality of communications beams B2 407, B4 411, B6 415, and B8 419. The beam quality of other communications beams of subset A may be similarly estimated.

When the beam quality is estimated for a communications beam that lies within two or more communications beams with measured beam quality, then data interpolation is used to estimate the beam quality. As an example, the beam quality of communications beam B2 407 is estimated from the measured beam quality of communications beams B1 405, B3 409, and B5 413 using data interpolation. When the beam quality is estimated for a communications beam that lies without two or more communications beams with measured beam quality, then data extrapolation is used to estimate the beam quality. As example, the beam quality of communications beam B1 405 is estimated from the measured beam quality of communications beams B2 407 and B4 411 using data extrapolation.

Although the discussion of the example embodiments presented herein focused on partitioning a rectangular grid arrangement of nine communications beams into two subsets: subset A with five communications beams arranged in a diagonal layout and subset B with four communications beams arranged in a diamond layout, other subset configurations may also be utilized. In general, any subset configuration may be used as long as each beam in one subset overlaps with at least two beams in the other subset.

In the examples discussed previously, the estimation of the beam quality of communications beams of subset B based on beam quality measurements of communications beams of subset A is using data interpolation, while the estimation of the beam quality of communications beams of subset A based on beam quality measurements of communications beams of subset B is using mostly data extrapolation (with an exception being the estimation of the beam quality of communications beam B5 413). In an embodiment, a determination of which subset to measure and which subset to estimate depends upon the arrangement of the communications beams of the subsets, individual beam patterns, individual beam widths, and so on.

Figure 10:
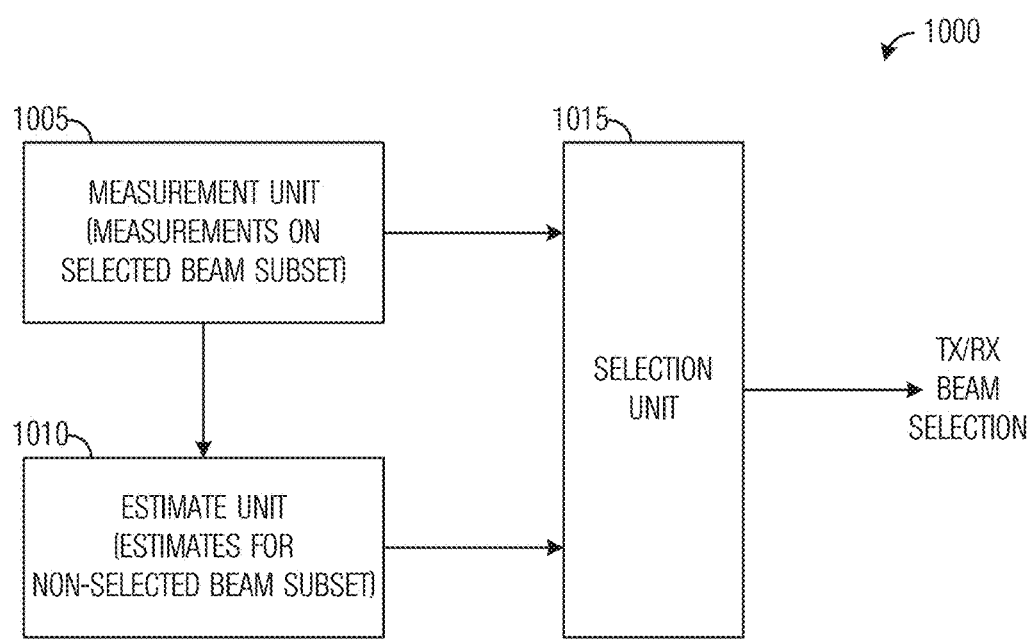
FIG. 10 illustrates a high level block diagram of a communications beam selection unit according to example embodiments presented herein.

FIG. 10 illustrates a high level block diagram of a communications beam selection unit 1000. Communications beam selection unit 1000 may be implemented in a receiving device to select a communications beam from a plurality of communications beams to use the selected communications beam to communicate with a transmitting device. Communications beam selection unit 1000 may be dedicated hardware in the receiving device, or communications beam selection unit 1000 may be implemented in software or firmware in the receiving device. Communications beam selection unit 1000 may also be a combination of both hardware and software. The receiving device may be a UE, for example.

Communications beam selection unit 1000 includes a measurement unit 1005 configured to measure received signals received from the transmitting device. Measurement unit 1005 is configured to measure a beam quality for each communications beam of the first subset of the plurality of communications beams of the receiving device, for example. Measurement unit 1005 is also configured to determine the weighting factors used in estimating the beam quality of communications beams of the second subset of the plurality of communications beams of the receiving device.

Communications beam selection unit 1000 also includes an estimate unit 1010 configured to estimate the beam quality for each communications beam of the second subset of the plurality of communications beams of the receiving device. Estimate unit 1010 is operatively coupled to measurement unit 1005. Measurement unit 1005 provides the measured beam quality of the communications beams of the first subset of the plurality of communications beams, as well as the weighting factors. Estimate unit 1010 estimates the beam quality of the communications beams of the second subset of the plurality of communications beams based on the measured beam quality of the communications beams of the first subset of the plurality of communications beams and the weighting factors.

Communications beam selection unit 1000 also includes a selection unit 1015 operatively coupled to measurement unit 1005 and estimate unit 1010. Selection unit 1015 is configured to select a communications beam from the plurality of communications beams of the receiving device. The selection of the communications beams is in accordance with the measured beam quality and the estimated beam quality, for example. The selection of the communications beam may be in accordance with a highest beam quality, for example. If there are multiple beams with substantially equal beam quality, the receiving device may randomly select one of the communications beams, or use a selection criterion in selecting the communications beam. Examples of the selection criterion may include usage history of the communications beams, performance history of the communications beams, available bandwidth of the communications beams, number of times the communications beams have been selected, and so forth. The receiving device uses the selected beam to communicate with the transmitting device.

Figures 11, 12:
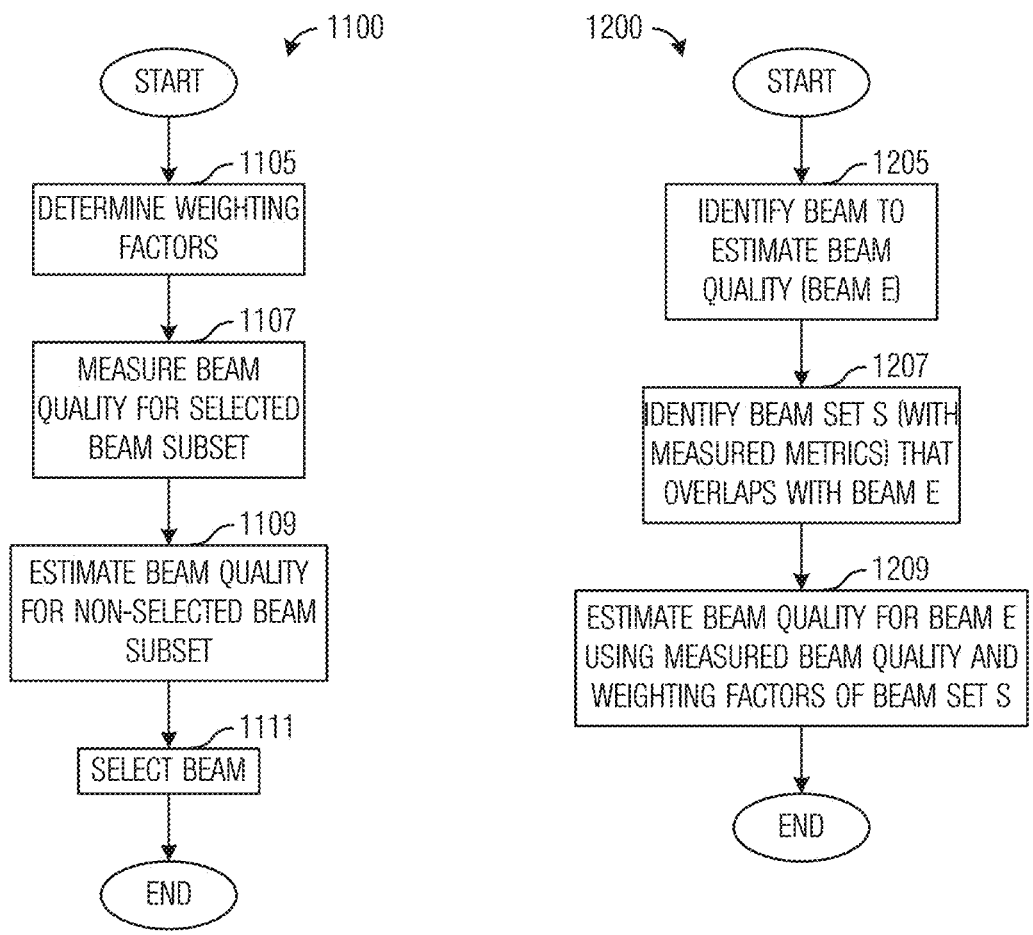
FIG. 11 illustrates a flow diagram of example operations occurring in a receiving device selecting a communications beam according to example embodiments presented herein.
FIG. 12 illustrates a flow diagram of example operations occurring in a receiving device estimating a beam quality of a communications beam according to example embodiments presented herein.

FIG. 11 illustrates a flow diagram of example operations 1100 occurring in a receiving device selecting a communications beam. Operations 1100 may be indicative of operations occurring in a receiving device as the receiving device selects a communications beam for use in communicating with a transmitting device. Receiving device may be a UE for example.

Operations 1100 begin with the receiving device determining weighting factors (block 1105). As discussed previously, the weighting factors are used in the estimating of beam quality of communications beams of a second subset of a plurality of communications beams based on measured beam quality of communications beams of a first subset of the plurality of communications beams.

The determining of the weighting factors may occur during a training period, for example. During the training period, the weighting factors may be trained in such a way that the beam quality of a communications beam may be estimated as a weighted sum of measured beam quality of communications beams that overlap the communications beam.

For discussion purposes, consider the example previously presented equation where the beam quality of communications beam B2 407 is estimated as:

rho2=a1*rho1+a3*rho3+a5*rho5, where rho2 is the estimated beam quality of communications beam B2 407; rho1, rho3 and rho5 are measured beam quality of communications beams B1 405, B3 409, and B5 413; and a1, a3 and a5 are weighting factors associated with communications beams B1 405, B3 409, and B5 413.

To accomplish the training of the weighting factors, during the training period, the beam quality of all four communications beams (B1 405, B2 407, B3 409, and B5 413) are measured. Example measurement results are shown in Table 1, where entry Qij represents the i-th record of the j-th communications beam's beam quality measurement.

TABLE 1

Beam Quality Measurement Results.

|  | Beam $B_1$ | Beam $B_2$ | Beam $B_3$ | Beam $B_5$ |
|---|---|---|---|---|
| Training Rec $_1$ | $Q_{11}$ | $Q_{12}$ | $Q_{13}$ | $Q_{15}$ |
| Training Rec $_2$ | $Q_{21}$ | $Q_{22}$ | $Q_{13}$ | $Q_{25}$ |
| Training Rec $_3$ | $Q_{31}$ | $Q_{32}$ | $Q_{33}$ | $Q_{35}$ |
| ... | ... | ... | ... | ... |
| Training Rec N | $QN_1$ | $Qn_2$ | $QN_3$ | $QN_5$ |

Solving for the weighting factors is a least square (LS) problem and any of a variety of LS solution techniques may be used to determine the weighting factors. As an example, a determining of the weighting factors using a linear LS solution is presented below. Non-linear LS solutions may also be used.

An example linear LS solution involves presenting the measurement data in equation form:

$$Q12 = a1*Q11 + a3*Q13 + a5*Q15$$

$$Q22 = a1*Q21 + a3*Q23 + a5*Q25$$

$$Q32 = a1*Q31 + a3*Q33 + a5*Q35$$

$$\ldots$$

$$QN2 = a1*QN1 + a3*QN3 + a5*QN5$$

which is expressible in matrix form as:

$$\underbrace{\begin{bmatrix} Q11 & Q13 & Q15 \\ Q21 & Q23 & Q25 \\ \ldots & \ldots & \ldots \\ QN1 & QN3 & QN5 \end{bmatrix}}_{A} \underbrace{\begin{bmatrix} a1 \\ a3 \\ a5 \end{bmatrix}}_{X} = \underbrace{\begin{bmatrix} Q12 \\ Q22 \\ \ldots \\ QN2 \end{bmatrix}}_{b}$$

The solution for X is expressible as:

$$X=(A^T A)^{-1}(A^T b)$$

The weighting factors x may be estimated based on the linear LS solution, where A represents the measurement results matrix from communications beams B1 405, B3 409, and B5 413; and b represents the measurement results vector from communications beam B2 407 during the training stage. The linear example shown above assumes that a linear estimator can be used to estimate the beam quality of communications beam B2 407 based on the measured beam quality of communications beams B1 405, B3 409, and B5 413. In general, a nonlinear estimator may be used, and hence, a nonlinear least square solution can be used.

During the training period, the transmit beam is fixed at the transmitting device. The receiving device receives signal using communications beam B1 405, makes measurements, and records the result as Q11. The receiving device receives the signal using communications beam B2 407 makes measurements, and records the result as Q12. The receiving device receives the signal using communications beam B3 409 makes measurements, and records the result as Q13. The receiving device receives the signal using communications beam B5 413 makes measurements, and records the result as Q15. The above is repeated for each of the transmit beams of the transmitting device. The results determined by the receiving device are stored in matrix A and vector b. The weighting factors are determined so that the beam quality of communications beam B2 407 can be estimated using the weighted sum of the measured beam quality of communications beams B1 405, B3 409, and B5 413.

In an embodiment, different communications beams have different weighting factors. As discussed above, communications beam B2 407 has weighting factors a1, a3, and a5. However, communications beam B4 411 has weighting factors a1, a5, and a7, and communications beam B6 415 has weighting factors a3, a5, and a9. Although the weighting factors may have similar names (e.g., a1 of communications beams B2 407 and B4 411), the actual value of the weighting factors may differ. As discussed previously, the values of the weighting factors are dependent upon the specific beam patterns, degree of beam overlapping or separation, and the beam quality metric (e.g., SINR, RSRP, RSRQ, etc.).

In the above presented example, an example linear LS solution is presented. However, a non-linear LS solution may be used. As an example, depending on the angle of arrival of the received signal (e.g., where the transmitter is located), the set of coefficients a1, a3, and a5 used to estimate the beam quality of communications beam B2 407 from the measured beam quality of communications beams B1 405, B3 409, and B5 413 may possess different values. This can be viewed as piece-wise linear approximation of the nonlinear LS solution. Furthermore, the above example is an example of estimating beam quality of communications beam B2 407 from the weighting factors a1, a3, and a5. The set of weighting factors may include different values if a beam quality for a different communications beam is to be estimated (e.g. beam quality of communications beams B4 411, B6 415, and B8 419), or if a different beam quality is used to form the estimation (e.g. beam quality of communications beams B1 405, B3 409, B5 413, B7 417, and B9 421).

After determining the weighting factors, the receiving device stores the weighting factors for subsequent use. The weighting factors may be stored in a memory of the receiving device. The training period may occur when the receiving device initially associates with the transmitting device, for example. The training period may also be repeated. The training period may be repeated periodically, for example. The training period may be repeated when a performance metric meets a specified threshold, for example. As an example, if an error rate of communications between the transmitting device and the receiving device exceeds a specified error threshold, the training period may be repeated. As another example, if a data rate of communications between the transmitting device and the receiving device falls below a specified data rate threshold, the training period may be repeated.

The receiving device measures the beam quality for communications beams of the first subset of the plurality of communications beams (block 1107). In order for the receiving device to measure the beam quality of the communications beams of the first subset, the transmitting device configures measurement resources and transmits the signal to the receiving device. However, the transmitting device may need to know how many measurement resources to configure. Although the receiving device supports a plurality of communications beams (e.g., N communications beams), the receiving device reports to the transmitting device that M measurement resources are needed, where M is the number of communications beams in the first subset. Therefore, the transmitting device configures M measurement resources for the receiving device. Each measurement resource occupies a unique time-frequency resource. All M measurement resources may be beamformed at the transmitting device using the same transmit beamformer. All M measurement resources may be received at the receiving device using a different receive beamformer, e.g., the M communications beam of the first subset.

The receiving device estimates the beam quality of the communications beams of the second subset (block 1109). The receiving device estimates the beam quality of a communications beam of the second subset based on the measured beam qualities of the communications beams of the first subset that overlaps with the communications beam of the second subset (for example, by using a weighted sum, a weighted product, a linear combination, a non-linear combination, etc.). Weights used to weigh the measured beam quality are the weighting factors determined in the training period, for example.

The receiving device selects a communications beam (block 1111). The selection of the communications beam may be in accordance with a highest beam quality, for example. If there are multiple beams with substantially equal beam quality, the receiving device may randomly select the communications beam from those with substantially equal beam quality, or use an additional selection criterion to select the communications beam. Examples of the selection criterion may include usage history of the communications beams, performance history of the communications beams, available bandwidth of the communications beams, number of times the communications beams has been selected, and so forth.

FIG. 12 illustrates a flow diagram of example operations 1200 occurring in a receiving device estimating a beam quality of a communications beam. Operations 1200 may be indicative of operations occurring in a receiving device as the receiving device estimates a beam quality of a communications beam using a weighted sum of measured beam qualities.

Operations 1200 begin with the receiving device identifying the communications beam to estimate beam quality, beam E (block 1205). As an example, the communications beam (beam E) is a member of the second subset of communications beams, where the communications beams of the first subset of communications beams are the communications beams with measured beam quality. The receiving device identifies a plurality of communications beams that overlaps with the communications beam (beam E), where the plurality of communications beams have measured beam quality (i.e., they are members of the first subset) (block 1207). In other words, the receiving device determines the members of the first subset that overlap the communications beam (beam E). The receiving device estimates the beam quality of the communications beam (beam E) based on the measured beam quality of the plurality of communications beams that overlap with the communications beam (beam E) (for example, by using a weighted sum, a weighted product, a linear combination, a non-linear combination, etc.) (block 1209). The weights applied to the measured beam quality are the weighting factors determined in the training period, for example. The weighting factors utilized by the receiving device may depend upon the communications beam whose beam quality is being estimated.

Figure 13:
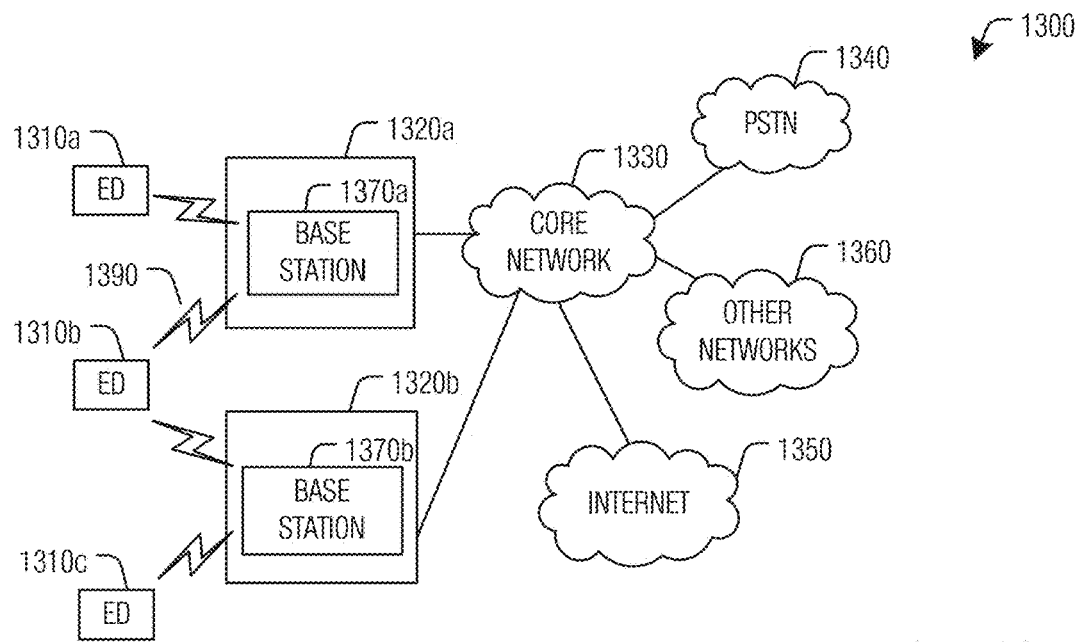
FIG. 13 illustrates an example communication system according to example embodiments presented herein.

FIG. 13 illustrates an example communication system 1300. In general, the system 1300 enables multiple wireless or wired users to transmit and receive data and other content. The system 1300 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 1300 includes electronic devices (ED) 1310a-1310c, radio access networks (RANs) 1320a-1320b, a core network 1330, a public switched telephone network (PSTN) 1340, the Internet 1350, and other networks 1360. While certain numbers of these components or elements are shown in FIG. 13, any number of these components or elements may be included in the system 1300.

The EDs 1310a-1310c are configured to operate or communicate in the system 1300. For example, the EDs 1310a-1310c are configured to transmit or receive via wireless or wired communication channels. Each ED 1310a-1310c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 1320a-1320b here include base stations 1370a-1370b, respectively. Each base station 1370a-1370b is configured to wirelessly interface with one or more of the EDs 1310a-1310c to enable access to the core network 1330, the PSTN 1340, the Internet 1350, or the other networks 1360. For example, the base stations 1370a-1370b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 1310a-1310c are configured to interface and communicate with the Internet 1350 and may access the core network 1330, the PSTN 1340, or the other networks 1360.

In the embodiment shown in FIG. 13, the base station 1370a forms part of the RAN 1320a, which may include other base stations, elements, or devices. Also, the base station 1370b forms part of the RAN 1320b, which may include other base stations, elements, or devices. Each base station 1370a-1370b operates to transmit or receive wireless signals within a particular geographic region or area, sometimes referred to as a "cell." In some embodiments, multiple-input multiple-output (MIMO) technology may be employed having multiple transceivers for each cell.

The base stations 1370a-1370b communicate with one or more of the EDs 1310a-1310c over one or more air interfaces 1390 using wireless communication links. The air interfaces 1390 may utilize any suitable radio access technology.

It is contemplated that the system 1300 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 1320a-1320b are in communication with the core network 1330 to provide the EDs 1310a-1310c with voice, data, application, Voice over Internet Protocol (VoIP), or other services. Understandably, the RANs 1320a-1320b or the core network 1330 may be in direct or indirect communication with one or more other RANs (not shown). The core network 1330 may also serve as a gateway access for other networks (such as the PSTN 1340, the Internet 1350, and the other networks 1360). In addition, some or all of the EDs 1310a-1310c may include functionality for communicating with different wireless networks over different wireless links using different wireless technologies or protocols. Instead of wireless communication (or in addition thereto), the EDs may communicate via wired communication channels to a service provider or switch (not shown), and to the Internet 1350.

Although FIG. 13 illustrates one example of a communication system, various changes may be made to FIG. 13. For example, the communication system 1300 could include any number of EDs, base stations, networks, or other components in any suitable configuration.

Figure 14A:
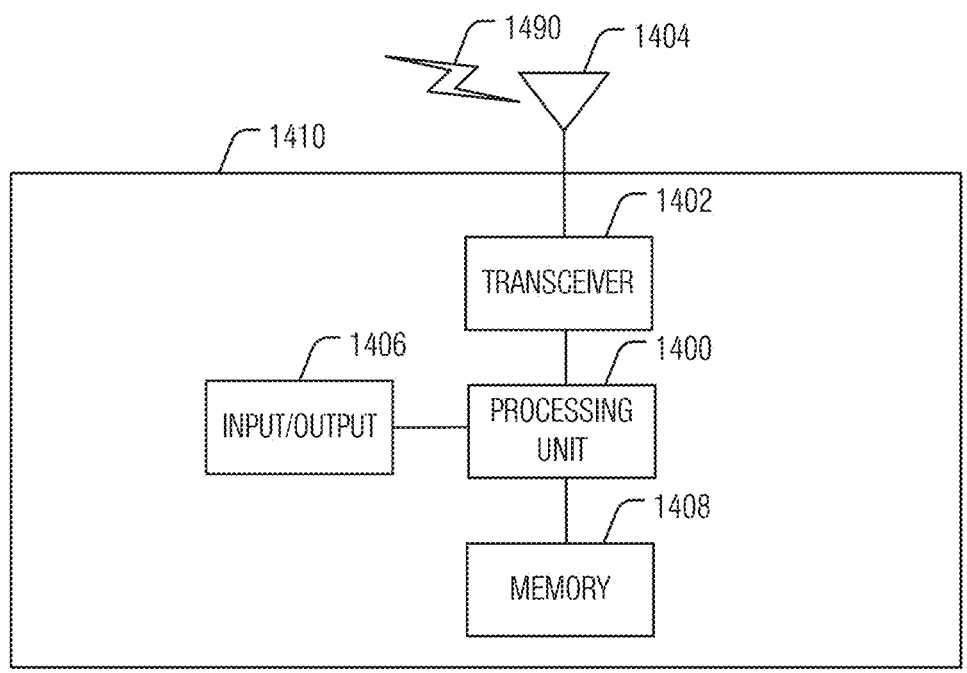
FIGS. 14A and 14B illustrate example devices that may implement the methods and teachings according to this disclosure.
Figure 14B:
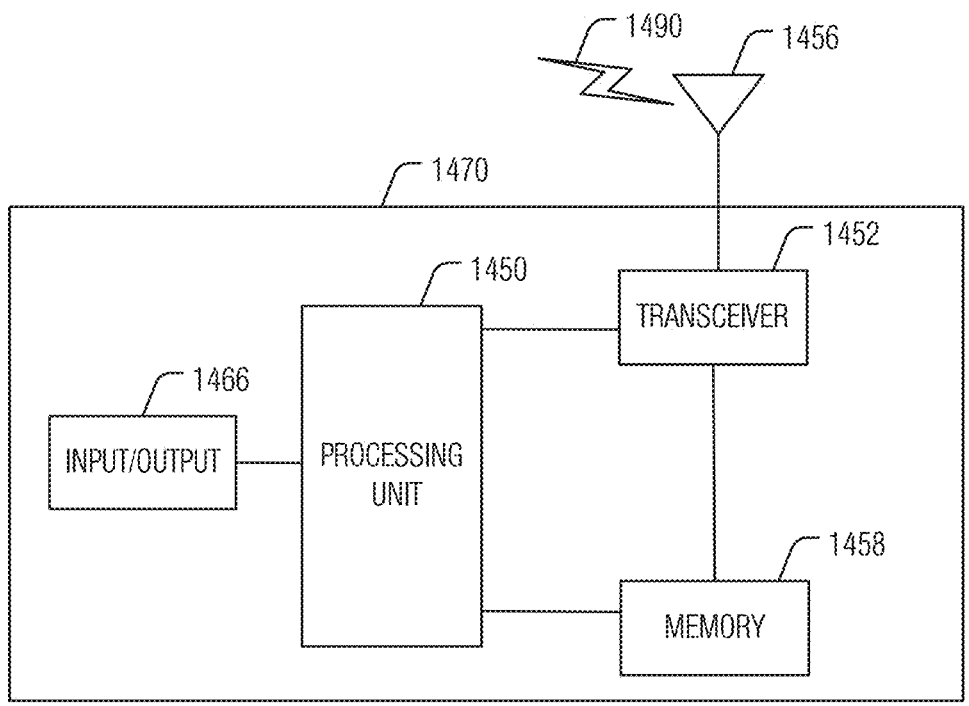

FIGS. 14A and 14B illustrate example devices that may implement the methods and teachings according to this disclosure. In particular, FIG. 14A illustrates an example ED 1410, and FIG. 14B illustrates an example base station 1470. These components could be used in the system 1300 or in any other suitable system.

As shown in FIG. 14A, the ED 1410 includes at least one processing unit 1400. The processing unit 1400 implements various processing operations of the ED 1410. For example, the processing unit 1400 could perform signal coding, data processing, power control, input/output processing, or any other functionality enabling the ED 1410 to operate in the system 1300. The processing unit 1400 also supports the methods and teachings described in more detail above. Each processing unit 1400 includes any suitable processing or computing device configured to perform one or more operations. Each processing unit 1400 could, for example, include a microprocessor, microcontroller, digital signal processor, field programmable gate array, or application specific integrated circuit. Each processing unit 1400 may include a communications beam selecting unit, as described in FIG. 10.

The ED 1410 also includes at least one transceiver 1402. The transceiver 1402 is configured to modulate data or other content for transmission by at least one antenna or NIC (Network Interface Controller) 1404. The transceiver 1402 is also configured to demodulate data or other content received by the at least one antenna 1404. Each transceiver 1402 includes any suitable structure for generating signals for wireless or wired transmission or processing signals received wirelessly or by wire. Each antenna 1404 includes any suitable structure for transmitting or receiving wireless or wired signals. One or multiple transceivers 1402 could be used in the ED 1410, and one or multiple antennas 1404 could be used in the ED 1410. Although shown as a single functional unit, a transceiver 1402 could also be implemented using at least one transmitter and at least one separate receiver.

The ED 1410 further includes one or more input/output devices 1406 or interfaces (such as a wired interface to the Internet 1350). The input/output devices 1406 facilitate interaction with a user or other devices (network communications) in the network. Each input/output device 1406 includes any suitable structure for providing information to or receiving information from a user, such as a speaker, microphone, keypad, keyboard, display, or touch screen, including network interface communications.

In addition, the ED 1410 includes at least one memory 1408. The memory 1408 stores instructions and data used, generated, or collected by the ED 1410. For example, the memory 1408 could store software or firmware instructions executed by the processing unit(s) 1400 and data used to reduce or eliminate interference in incoming signals. As an example, memory 1408 may store the software or firmware associated with communications beam selection unit, as described in FIG. 10. Each memory 1408 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 14B, the base station 1470 includes at least one processing unit 1450, at least one transceiver 1452, which includes functionality for a transmitter and a receiver, one or more antennas 1456, at least one memory 1458, and one or more input/output devices or interfaces 1466. A scheduler, which would be understood by one skilled in the art, is coupled to the processing unit 1450. The scheduler could be included within or operated separately from the base station 1470. The processing unit 1450 implements various processing operations of the base station 1470, such as signal coding, data processing, power control, input/output processing, or any other functionality. The processing unit 1450 can also support the methods and teachings described in more detail above. Each processing unit 1450 includes any suitable processing or computing device configured to perform one or more operations. Each processing unit 1450 could, for example, include a microprocessor, microcontroller, digital signal processor, field programmable gate array, or application specific integrated circuit.

Each transceiver 1452 includes any suitable structure for generating signals for wireless or wired transmission to one or more EDs or other devices. Each transceiver 1452 further includes any suitable structure for processing signals received wirelessly or by wire from one or more EDs or other devices. Although shown combined as a transceiver 1452, a transmitter and a receiver could be separate components. Each antenna 1456 includes any suitable structure for transmitting or receiving wireless or wired signals. While a common antenna 1456 is shown here as being coupled to the transceiver 1452, one or more antennas 1456 could be coupled to the transceiver(s) 1452, allowing separate antennas 1456 to be coupled to the transmitter and the receiver if equipped as separate components. Each memory 1458 includes any suitable volatile or non-volatile storage and retrieval device(s). Each input/output device 1466 facilitates interaction with a user or other devices (network communications) in the network. Each input/output device 1466 includes any suitable structure for providing information to or receiving/providing information from a user, including network interface communications.

Figure 15:
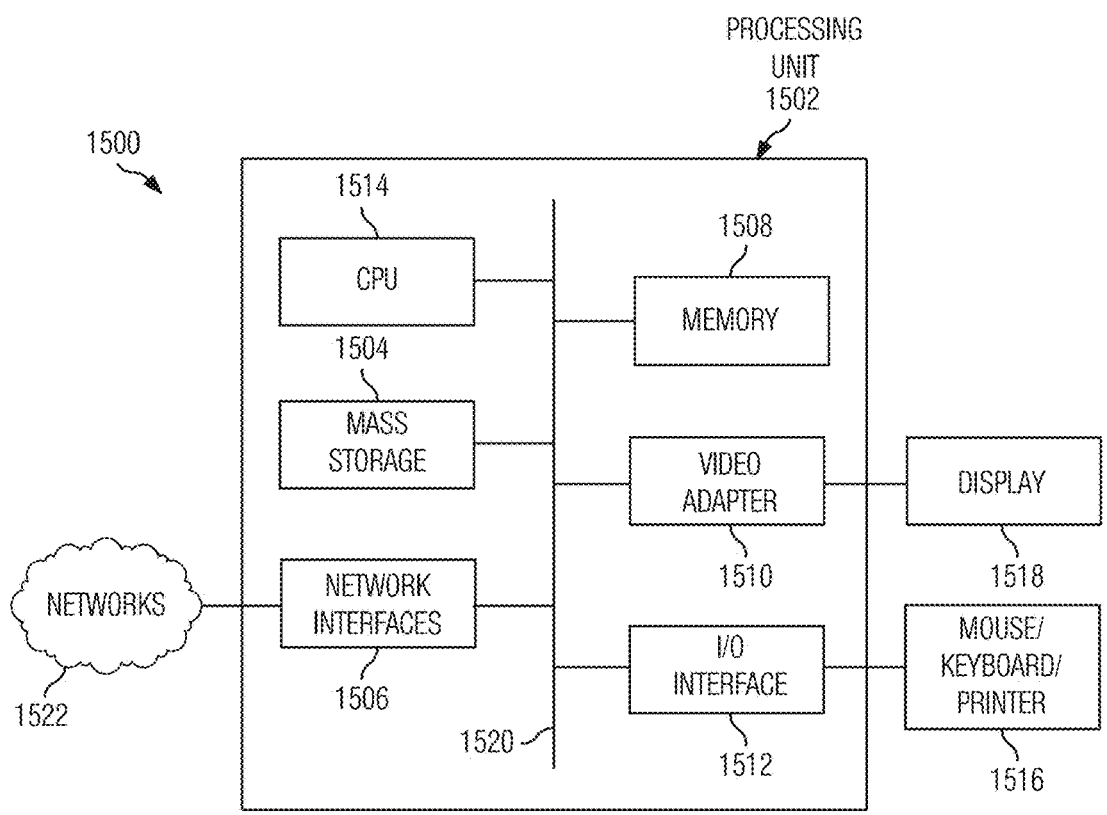
FIG. 15 is a block diagram of a computing system that may be used for implementing the devices and methods disclosed herein.

FIG. 15 is a block diagram of a computing system 1500 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1500 includes a processing unit 1502. The processing unit includes a central processing unit (CPU) 1514, memory 1508, and may further include a mass storage device 1504, a video adapter 1510, and an I/O interface 1512 connected to a bus 1520.

The bus 1520 may be one or more of any type of several bus architectures including a memory bus or memory controller, a peripheral bus, or a video bus. The CPU 1514 may comprise any type of electronic data processor. The memory 1508 may comprise any type of non-transitory system memory such as static random access memory (SRAM), dynamic random access memory (DRAM), synchronous DRAM (SDRAM), read-only memory (ROM), or a combination thereof. In an embodiment, the memory 1508 may include ROM for use at boot-up, and DRAM for program and data storage for use while executing programs.

The mass storage 1504 may comprise any type of non-transitory storage device configured to store data, programs, and other information and to make the data, programs, and other information accessible via the bus 1520. The mass storage 1504 may comprise, for example, one or more of a solid state drive, hard disk drive, a magnetic disk drive, or an optical disk drive.

The video adapter 1510 and the I/O interface 1512 provide interfaces to couple external input and output devices to the processing unit 1502. As illustrated, examples of input and output devices include a display 1518 coupled to the video adapter 1510 and a mouse, keyboard, or printer 1516 coupled to the I/O interface 1512. Other devices may be coupled to the processing unit 1502, and additional or fewer interface cards may be utilized. For example, a serial interface such as Universal Serial Bus (USB) (not shown) may be used to provide an interface for an external device.

The processing unit 1502 also includes one or more network interfaces 1506, which may comprise wired links, such as an Ethernet cable, or wireless links to access nodes or different networks. The network interfaces 1506 allow the processing unit 1502 to communicate with remote units via the networks. For example, the network interfaces 1506 may provide wireless communication via one or more transmitters/transmit antennas and one or more receivers/receive antennas. In an embodiment, the processing unit 1502 is coupled to a local-area network 1522 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a generating unit or module, a measuring unit or module, an estimating unit or module, or a determining unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the scope of the disclosure as defined by the appended claims.

What is claimed is:

1. A method implemented by a first device, the method comprising:
receiving, by the first device from a second device, a signal using each beam of a first subset of beams of a beam set arranged in a layout;
measuring, by the first device, a beam quality of the signal received using each beam of the first subset of beams;
estimating, by the first device, a beam quality of the signal for each beam of a second subset of beams of the beam set, the first subset of beams and the second subset of beams comprising different beams, the second subset comprising at least one beam whose beam quality is not measured, and the estimating being in accordance with the measured signal quality of the first subset of beams;

selecting, by the first device, a beam from the beam set, selecting the beam being in accordance with the measured beam quality and the estimated beam quality; and communicating, by the first device with the second device, using the selected beam.

2. The method of claim 1, the first subset of beams and the second subset of beams being disjoint.

3. The method of claim 1, a coverage area of each beam of the second subset of beams partially overlapping a coverage area of at least two beams of the first subset of beams.

4. The method of claim 1, estimating the beam quality comprising, for each beam of the second subset of beams, determining the estimated beam quality of the beam of the second subset of beams as a combination of the measured beam quality of at least two beams of the first subset of beams having a coverage area that partially overlaps a coverage area of the beam of the second subset of beams.

5. The method of claim 4, wherein the combination includes one of a sum, a weighted sum, a product, a weighted product, a linear combination, or a non-linear combination, of the measured beam quality of the at least two beams.

6. The method of claim 5, the estimated beam quality being a weighted sum of the measured beam quality of the at least two beams, and the method further comprising determining, by the first device, a weighting factor for each beam of the first subset of beams.

7. The method of claim 1, wherein the beam quality comprises at least one of a signal plus interference to noise ratio (SINR) of the signal, a signal to noise ratio (SNR) of the signal, a reference signal received power (RSRP) of the signal, a reference signal received quality (RSRQ) of the signal, or a received signal power of the signal.

8. The method of claim 1, the first device being a user equipment (UE), and the second device being an access node.

9. The method of claim 1, the beam set comprising 9 beams arranged in a 3×3 grid layout, and the first subset of beams comprising 4 beams arranged in a diamond layout.

10. The method of claim 1, the beam set comprising 9 beams arranged in a 3×3 grid layout, and the first subset of beams comprising 5 beams arranged in a diagonal layout.

11. The method of claim 1, the beam set comprising 7 beams arranged in a hexagonal layout, the first subset of beams and the second subset of beams comprising different beams of the 7 beams.

12. A first device comprising:
a non-transitory memory storage comprising instructions; and
one or more processors in communication with the memory storage, wherein the one or more processors execute the instructions to:
receive, from a second device, a signal using each beam of a first subset of beams of a beam set arranged in a layout;

measure a beam quality of the signal received using each beam of the first subset of beams;

estimate a beam quality of the signal for each beam of a second subset of beams of the beam set, the first subset of beams and the second subset of beams comprising different beams, the second subset comprising at least one beam whose beam quality is not measured, and the estimating of the beam quality of the signal being in accordance with the measured signal quality of the first subset of beams;

select a beam from the beam set, selecting the beam being in accordance with the measured beam quality and the estimated beam quality; and communicate, with the second device, using the selected beam.

13. The first device of claim 12, the first subset of beams and the second subset of beams being disjoint.

14. The first device of claim 12, a coverage area of each beam of the second subset of beams partially overlapping a coverage area of at least two beams of the first subset of beams.

15. The first device of claim 12, the one or more processors further executing the instructions to, for each beam of the second subset of beams, determine the estimated beam quality of the beam of the second subset of beams as a combination of the measured beam quality of at least two beams of the first subset of beams having a coverage area that partially overlaps a coverage area of the beam of the second subset of beams.

16. The first device of claim 15, wherein the combination includes one of a sum, a weighted sum, a product, a weighted product, a linear combination, or a non-linear combination, of the measured beam quality of the at least two beams.

17. The first device of claim 16, the estimated beam quality being a weighted sum of the measured beam quality of the at least two beams, and the one or more processors further executing the instructions to determine a weighting factor for each beam of the first subset of beams.

18. The first device of claim 12, wherein the beam quality comprises at least one of a signal plus interference to noise ratio (SINR) of the signal, a signal to noise ratio (SNR) of the signal, a reference signal received power (RSRP) of the signal, a reference signal received quality (RSRQ) of the signal, or a received signal power of the signal.

19. The first device of claim 12, the beam set comprising 9 beams arranged in a 3×3 grid layout, and the first subset of beams comprising 4 beams arranged in a diamond layout.

20. The first device of claim 12, the beam set comprising 9 beams arranged in a 3×3 grid layout, and the first subset of beams comprising 5 beams arranged in a diagonal layout.

21. The first device of claim 12, the beam set comprising 7 beams arranged in a hexagonal layout, the first subset of beams and the second subset of beams comprising different beams of the 7 beams.

* * * * *